Nov. 16, 1926.                                        1,606,750
               H. F. CLARK
             MAKING SHEET GLASS
         Filed August 23, 1924    3 Sheets-Sheet 3

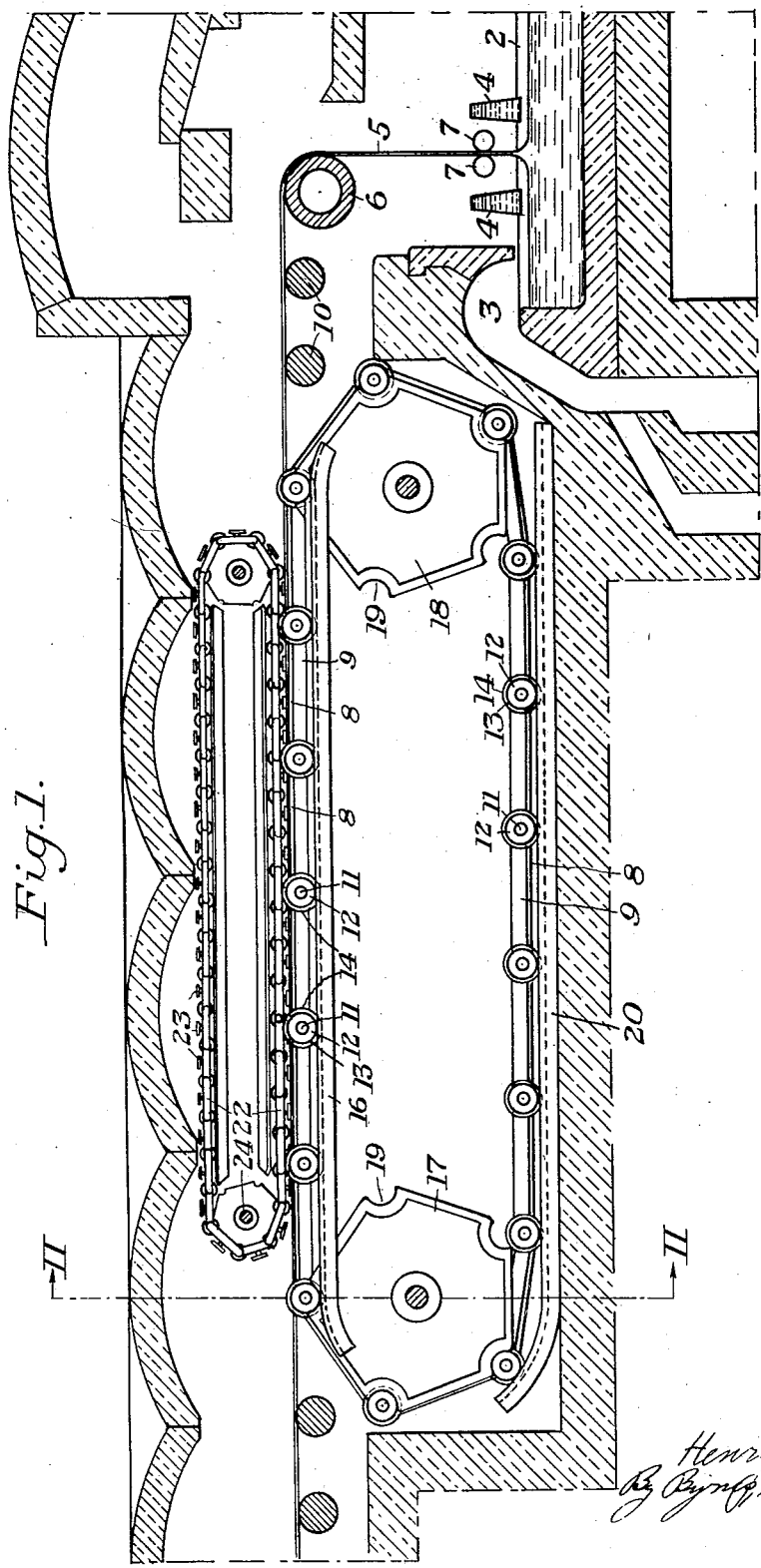

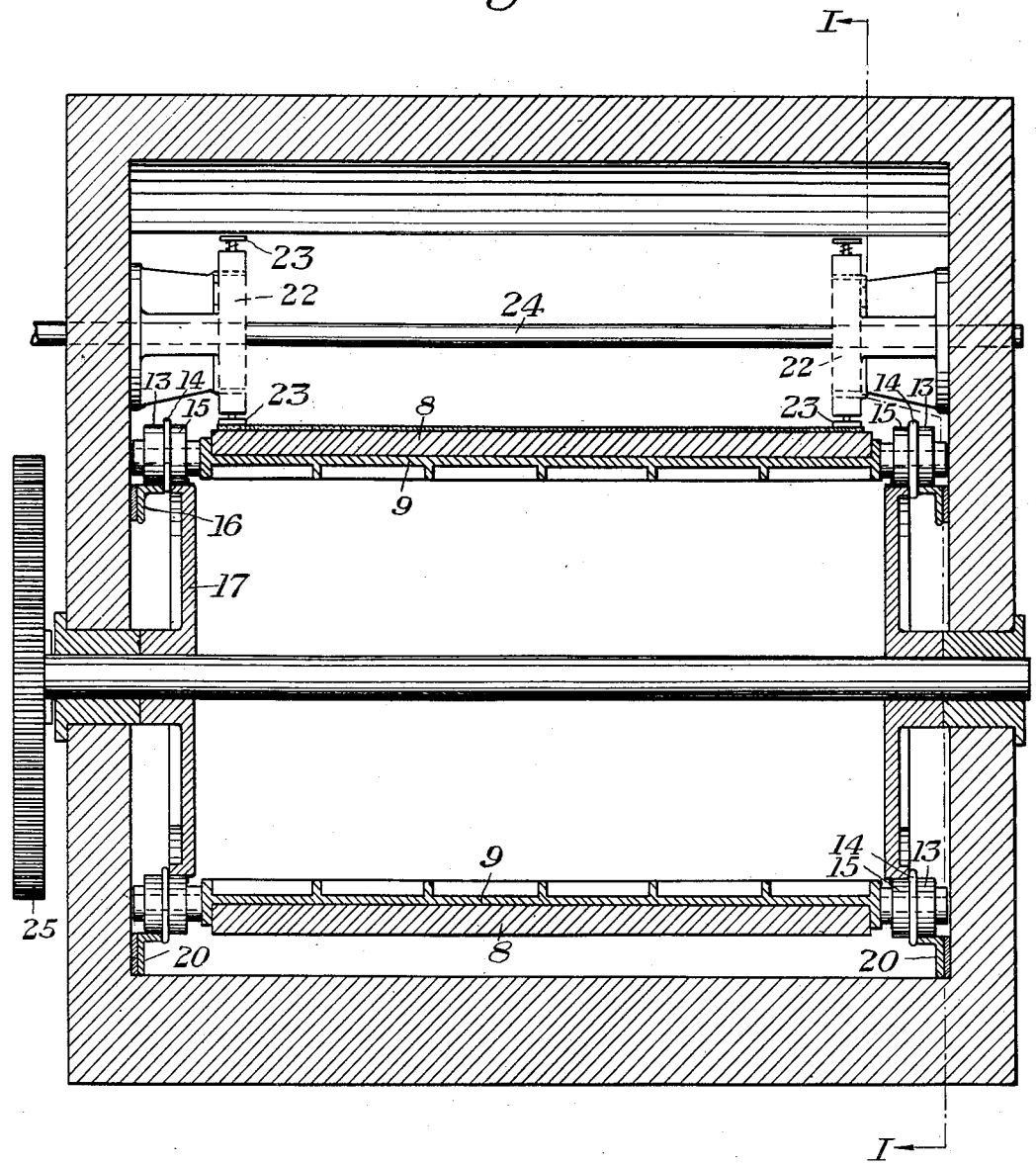

INVENTOR
Henry F. Clark
By Byrne, Stebbins & Parmelee
His Atty

Patented Nov. 16, 1926.

1,606,750

UNITED STATES PATENT OFFICE.

HENRY F. CLARK, OF BELLE VERNON, PENNSYLVANIA, ASSIGNOR TO WINDOW GLASS MACHINE COMPANY, OF PITTSBURGH, PENNSYLVANIA, A CORPORATION OF NEW JERSEY.

MAKING SHEET GLASS.

Application filed August 23, 1924. Serial No. 733,746.

This invention relates to the making of sheet glass and is particularly applicable to glass drawing apparatus where glass in sheet form is drawn upwardly from a molten bath, passed over a bending roll and through a horizontally extending leer, although it may also be applied to other processes of making glass in sheet form.

Great difficulty has been experienced in the sheet drawing process where a bending roll is employed due to waves and wrinkles which are found in the sheet after it passes over the bending roll. It has been proposed to overcome this difficulty in a variety of ways, as by providing a supporting surface somewhat similar to the chain grate of a stoker, and providing traction for the sheet through such chain support. While this is effective for removing, to some extent, the defects occasioned by the drawing operation, it gives rise to other defects just as serious. The glass is generally marked by contact with the chain surface and it is moreover difficult to maintain a perfectly flat supporting surface with such apparatus.

I provide for supporting the advancing glass sheet on a plurality of smooth abutting slabs forming a substantially continuous surface, advancing the sheet while so supported and utilizing the sheet portions within the limits of such slabs. With such an apparatus any marking occasioned by the supporting apparatus is restricted to the division lines between adjacent slabs, no marking being occasioned by the slabs themselves. The marking is therefore unimportant, since the slabs may be placed very close to one another and the mark made on the glass at the abutment of the slabs utilized as a marker for dividing the delivered glass into sheets, which sheets may be later cut to commercial sizes.

I preferably provide slabs of a suitable refractory material, such as carborundum, and support these slabs in the form of a continuous chain which is moved forward at the same speed as the glass. Edge clamping means are also provided for preventing slippage of the glass on the slabs and securing the desired stretching and flattening action without any of the defects occasioned by the use of the chain tables heretofore employed.

In the accompanying drawings, illustrating the present preferred embodiment of my invention:

Figure 1 is a vertical section through a forehearth and a portion of a connected leer embodying my invention;

Figure 2 is a vertical section on the line II—II of Figure 1;

Figure 4:
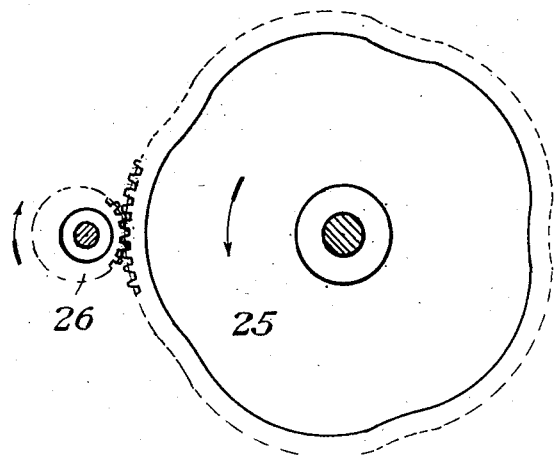
Figure 4 is a view, more or less diagrammatic, showing a preferred form of drive.

In the illustrated embodiment of the invention, there is shown a forehearth 2 supplied with molten glass from any convenient source, such as a connected tank. The glass in the forehearth is suitably heated from the tank and also by heating flue 3 at the end remote from the tank. Water coolers 4 are provided for maintaining the desired temperature condition in the drawing zone. The glass sheet 5 is drawn upwardly over a bending roll 6 which may or may not be driven as desired and edge rolls 7 are provided for maintaining the sheet to desired width.

After the glass passes over the bending roll 6, it travels in a generally horizontal direction and is supported by a plurality of refractory slabs 8, each carried on a truck 9. Intermediate the bending roll and the point where the glass is engaged by such refractory slabs, supporting rolls 10 are provided.

The trucks 8 are each pivotally connected to the adjacent truck on an axis 11 and rollers 12 are provided having the same axis. The rollers 12 comprise a face portion 13, a flange 14 and a face portion 15. The face portions 13 roll on tracks 16 so the entire series of slabs in contact with the glass may be properly supported, thus giving a substantially continuous surface broken only by a hair line crack between adjacent slabs. Sprockets 17 and 18 are provided for the trucks 8, the sprockets being provided with recesses 19 which engage the face portions 15 of the truck rollers 11. This construction of the rollers is preferred, since the tracks 16 may be extended well past the center line of the sprocket shafts, as shown in Figure 1, thus rigidly supporting the trucks during the entire time of contact of the slabs 8 with the glass. The sprocket 17 is preferably the driver so that the working run of trucks is under tension and all slack is in the lower run.

Figure 3:
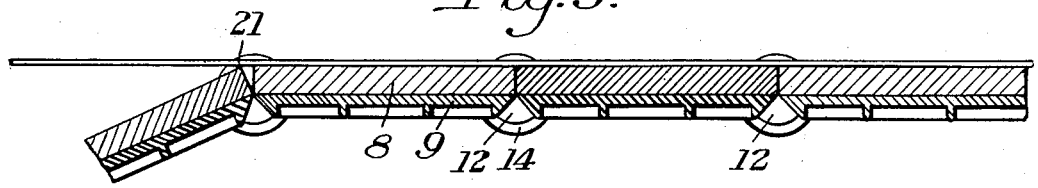
Figure 3 is a detail section showing the manner of mounting the refractory slabs.

A truck running along the tracks 16 is engaged by the sprocket 17 when it reaches the end of its horizontal travel, is turned over and returned to the forehearth end of the leer on tracks 20, after which it passes around the sprocket 18 back onto the tracks 16. Obviously it is desirable that when a slab is being tilted toward or away from horizontal position, as occurs whenever a slab passes over the sprocket 18 into contact with the glass or over the sprocket 17 out of contact with the glass, that the edge portions of the slab should not rise but that the entire slab should drop away from the glass, thus preventing marking. As clearly shown in Figure 3, this is accomplished by spacing the axis 11 at least as far apart as the width of the slabs. There is shown in the left hand portion of Figure 3 a slab which has been tilted as it passes to the sprocket 17 and it will be observed that the edge 21 moves out of contact with the glass with no tendency whatever toward marking of the sheet. If desired, the tracks 16 may be tilted slightly at the end portions thereof so that a slab is gradually moved away from the sheet before it reaches the end sprocket. This, however, results in the lengthening of the apparatus and a wider gap between supports at the end of the row of slabs.

Clamping means comprising sprocket chains 22 having presser feet 23 are provided for clamping the edge portions of the sheet against the refractory slabs 8. These chains are preferably driven as by a shaft 24. With the sheet edges thus clamped, the desired flattening action occurs on the slabs 8 and without any of the marking which occurs in the use of chain tables, except as above mentioned, at the line of abutment of adjacent slabs.

As is well known, where a large sprocket with very few teeth is employed the chain which the sprocket drives moves irregularly and I therefore provide means for overcoming this tendency and causing forward movement of the trucks at uniform speed at all times. This is accomplished by means of a special gear 25 meshing with an eccentric pinion 26. It will be noted that the gear 25 is not truly circular but is provided with lobes corresponding to the number of recesses 19 on the sprocket wheel 17. The drive is through the pinion 26 and due to the eccentricity of the pinion and the shape of the gear, non-uniform angular motion of the sprocket 17 will result. This may be in suitable amounts to compensate for the characteristic driving action of the sprocket and thus impart an absolutely uniform velocity to the trucks 8.

Figure 5:
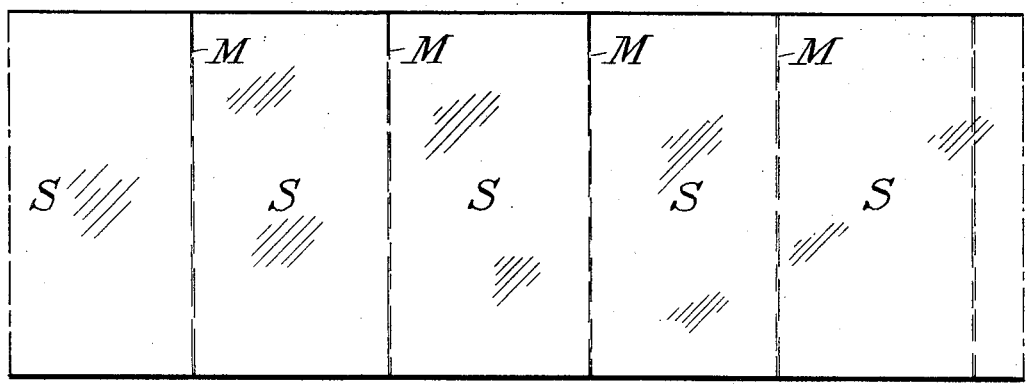
Figure 5 is a plan view of the glass as it issues from the leer.

The resulting product is shown in Figure 5. It will be seen that the glass comprises sheets S divided by lines or marks M across the sheet. These lines are utilized as guides for dividing the glass into separate sheets which can then be cut into commercial sizes. It will be understood that to prevent wastage it is preferable that the slabs abut one another, as shown in the drawings. However, this is not essential and the slabs may be spaced apart somewhat but such practice will result in a reduction in the percentage of perfect glass produced.

It will be seen that I eliminate the great difficulties which have heretofore attended in flattening apparatus for use in connection with a sheet drawing process, as I provide means which do not mark the glass in any way, at least in so far as relates to the portions which are to be actually used. Furthermore, I utilize the very few remaining marks to indicate a cutting line for dividing the glass into sheets of suitable size.

While I have shown the preferred form of my invention, it will be understood that I am not limited thereto, as the invention may be otherwise embodied within the scope of the following claim:

I claim:

Apparatus for making sheet glass, including a plurality of smooth slabs pivotally connected to form a chain, sprockets for such chain, and means for driving one of the sprockets at varying angular velocity to provide uniform linear velocity for such chain, substantially as described.

In testimony whereof I have hereunto set my hand.

HENRY F. CLARK.